Sept. 1, 1925.
J. SVENDSGAARD
1,551,855
APPARATUS FOR MAKING COFFEE AND THE LIKE
Filed May 28, 1924  5 Sheets-Sheet 5
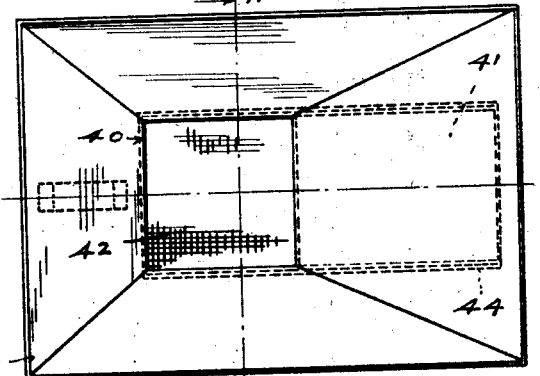
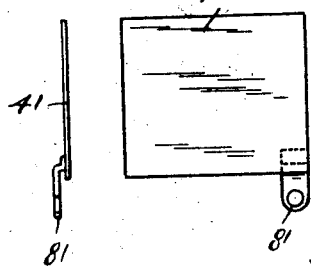
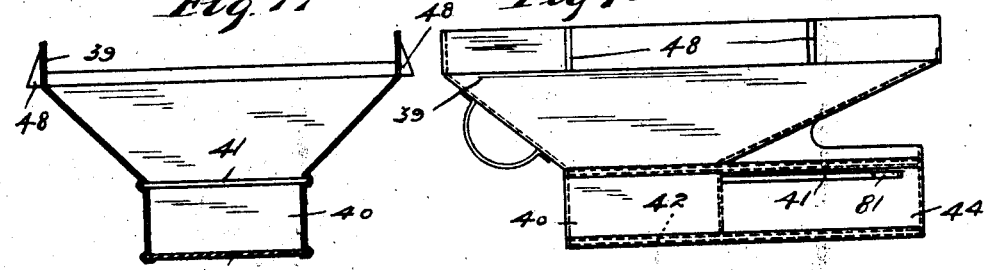
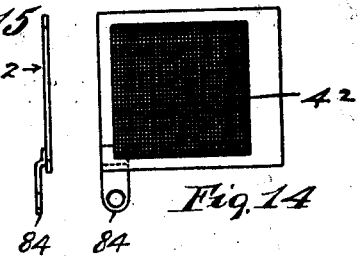
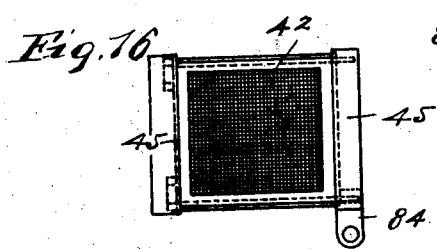
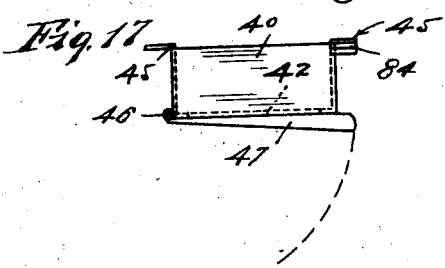
Inventor
John Svendsgaard
By his Attorneys Patented Sept. 1, 1925.

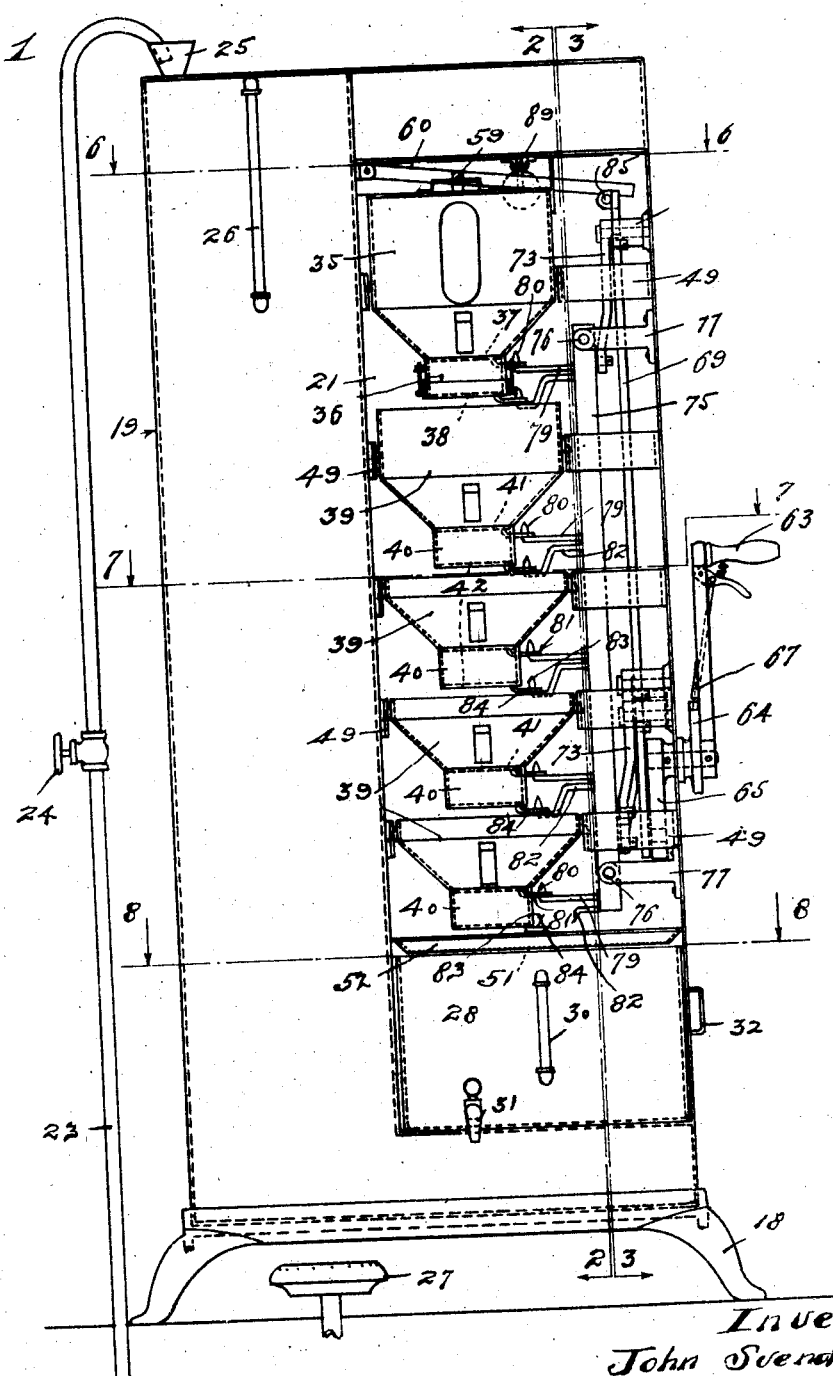

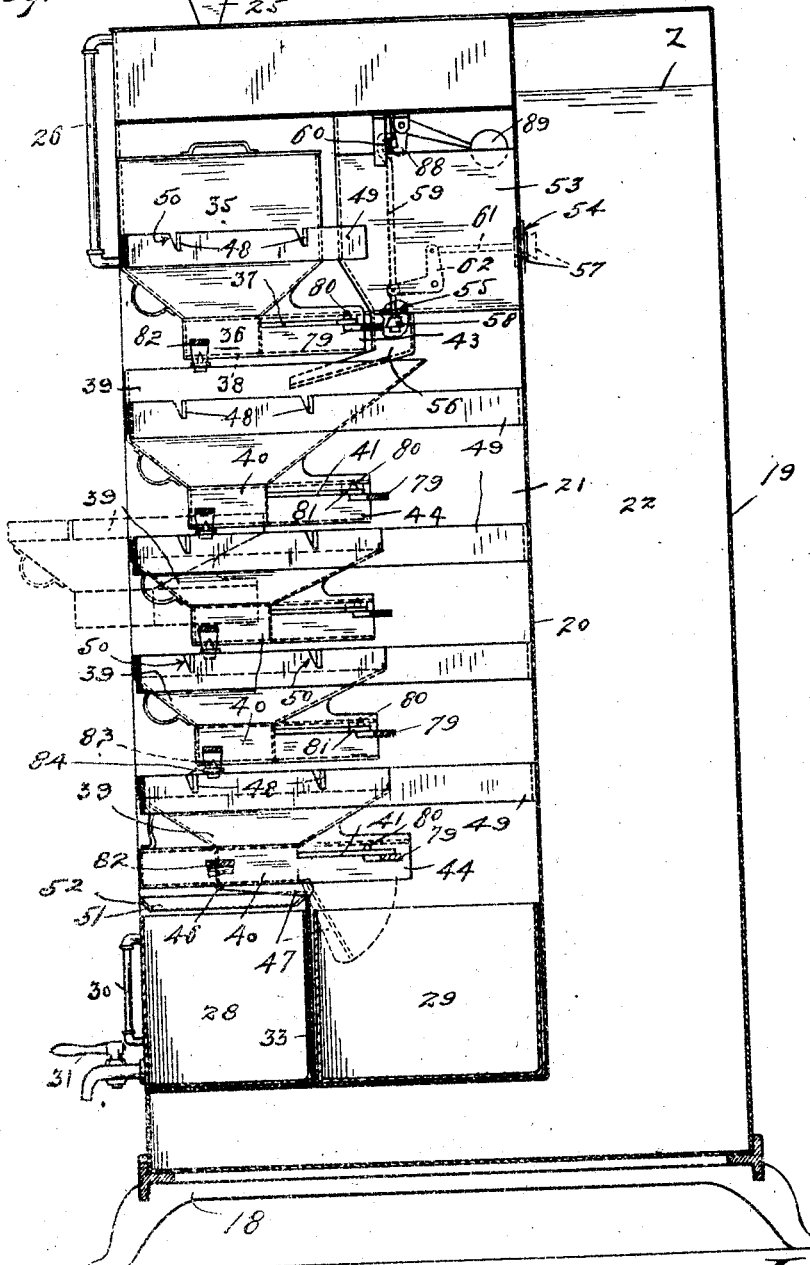

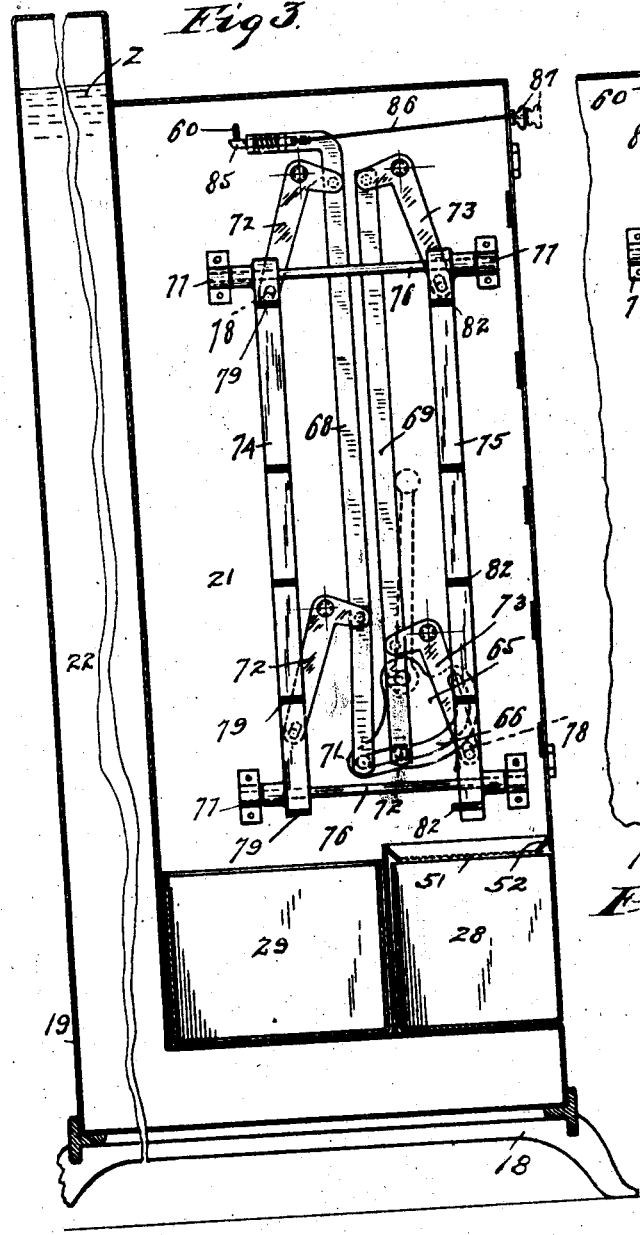
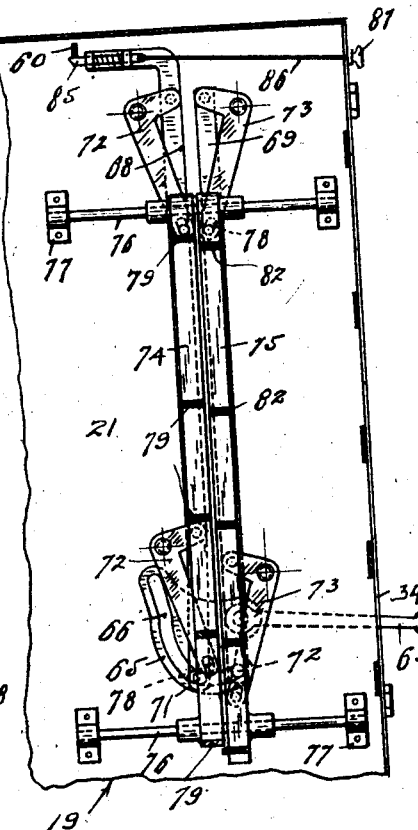
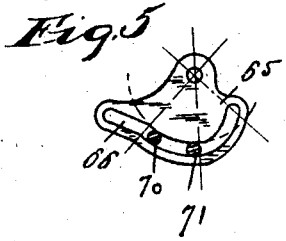

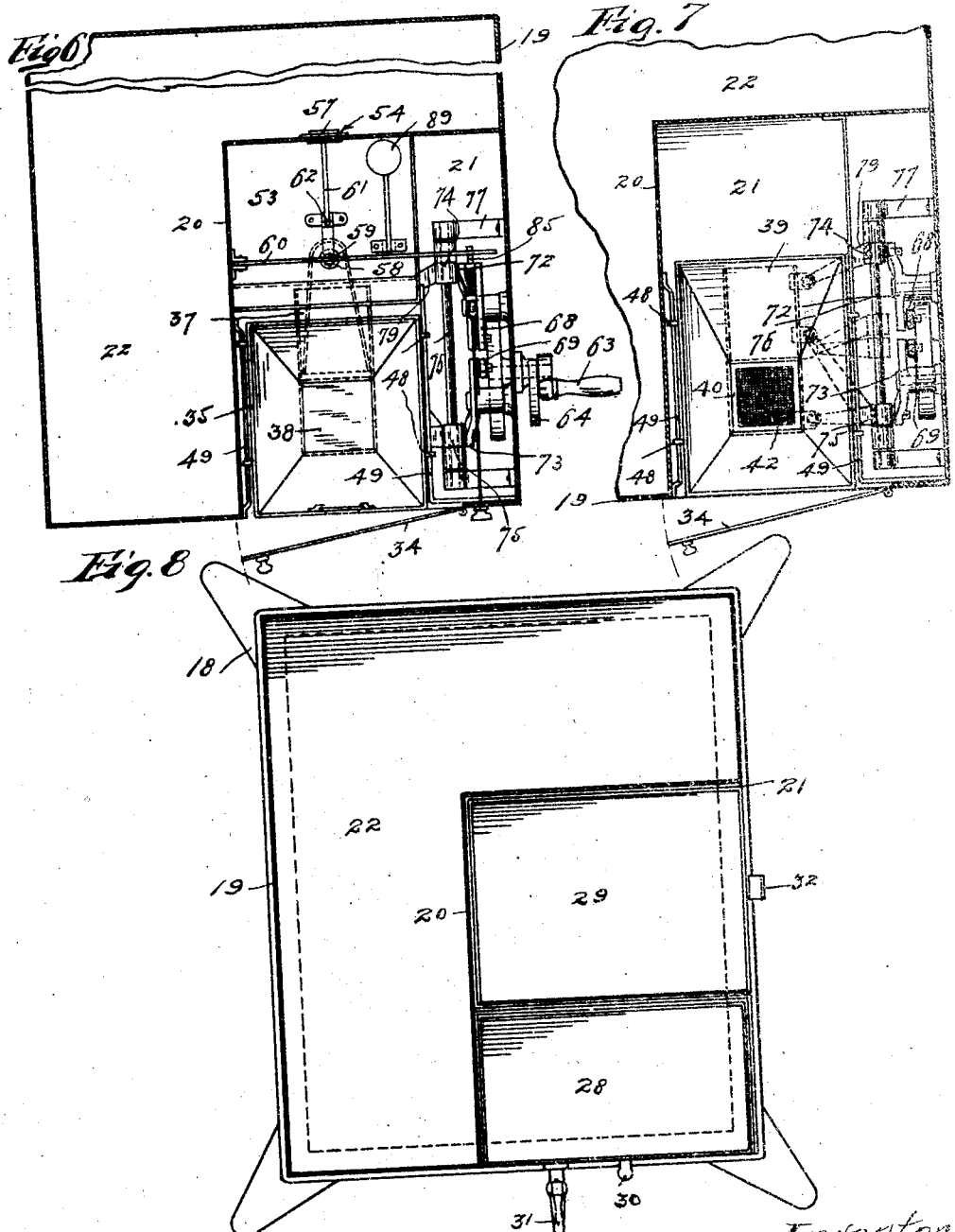

1,551,855

UNITED STATES PATENT OFFICE.

JOHN SVENDSGAARD, OF MINNEAPOLIS, MINNESOTA, ASSIGNOR OF ONE-FOURTH TO CLIFFORD W. KUBON, OF MINNEAPOLIS, MINNESOTA.

APPARATUS FOR MAKING COFFEE AND THE LIKE.

Application filed May 28, 1924. Serial No. 716,393.

*To all whom it may concern:*

Be it known that I, JOHN SVENDSGAARD, a citizen of the United States, residing at Minneapolis, in the county of Hennepin and State of Minnesota, have invented certain new and useful Improvements in Apparatus for Making Coffee and the like; and I do hereby declare the following to be a full, clear, and exact description of the invention, such as will enable others skilled in the art to which it appertains to make and use the same.

My invention has for its object to provide a novel process and apparatus for making coffee and other extracts, and to such ends, the invention consists of the novel process, devices and combinations of devices hereinafter described and defined in the claims.

In the accompanying drawings, which illustrate the invention, like characters indicate like parts throughout the several views.

Referring to the drawings:

Fig. 1 is a front elevation of the apparatus, with the door removed;

Fig. 2 is a vertical section taken on the line 2—2 of Fig. 1;

Fig. 3 is a vertical section taken on the line 3—3 of Fig. 1;

Fig. 4 is a fragmentary view corresponding to Fig. 3 with the exception that the movable parts are adjusted into different positions;

Fig. 5 is a side view of the operating cam;

Fig. 6 is a horizontal section taken on the line 6—6 of Fig. 1;

Fig. 7 is a horizontal section taken on the line 7—7 of Fig. 1;

Fig. 8 is a horizontal section taken on the line 8—8 of Fig. 1;

Fig. 9 is a plan view of one of the intermediate pans;

Fig. 10 is a side view of the same;

Fig. 11 is a vertical section taken on the line 11—11 of Fig. 9;

Fig. 12 is a plan view of the cut-off plate removed from the pan shown in Fig. 9;

Fig. 13 is an edge view of the same;

Fig. 14 is a plan view of the sieve removed from the pan shown in Fig. 9;

Fig. 15 is an edge elevation of the same;

Fig. 16 is a plan view of the sieve and cut-off plate for the lower pan; and

Fig. 17 is a side view of the same.

The improved process and apparatus will be described and claimed as used in making coffee.

The improved process of making coffee by the use of vertically spaced sieves consists in depositing a given quantity of ground coffee on the sieves, in pouring boiling water on the ground coffee on the uppermost sieve, and which water is precipitated onto the ground coffee on the underlying sieves, in precipitating the ground coffee from one sieve to the other, in intercepting the ground coffee as the same is being precipitated from one sieve to the other, in repeating the process of depositing given quantities of ground coffee on the uppermost sieve, in removing the coffee grounds from the lowermost sieve and in collecting the liquid coffee from the lowermost sieve.

In the apparatus for carrying out the above process, the numeral 18 indicates a rectangular leg-equipped base on which is mounted a correspondingly formed shell 19 having an L-shaped vertical partition 20 that divides said shell into a housing 21 and a water compartment 22 that extends along the entire left-hand side and back of said housing. The lower edge of the partition 20 terminates above the bottom of the shell 19 so that the water compartment 22 extends under the bottom of the housing 21.

Water $z$ is supplied to the water compartment 22 through a water pipe 23 leading from any suitable source of supply and having interposed therein a cut-off valve 24. The upper end portion of the water pipe 23 is in the form of a gooseneck, the discharge end of which extends into a funnel 25 on top of the shell 19 and opens into the water compartment 22. A water gauge 26 is secured to the shell 19 near the top of the water compartment 22 and opens therein.

Under the water compartment 22 is a gas burner 27 for heating the water $z$ to the proper temperature. The purpose of extending the water compartment 22 on two sides and under the housing 21 is to keep the liquid or ready-made coffee hot, as will presently appear.

Supported on the bottom of the housing 21 is a tank 28, for ready-made coffee, and a tank 29, for the waste coffee grounds, both of which have open tops. The tank 28 is arranged to slide out of the housing 21 at the front thereof and is provided with a coffee gauge 30 and a faucet 31 through which the liquid coffee may be drawn from said tank. The tank 29 is located back of the tank 28 and is arranged to slide out of the housing 21 through an opening in the right-hand side thereof so that the coffee grounds may be emptied therefrom, and is provided with a handle 32. Within the housing 21 is a partition 33 located between the tanks 28 and 29 and extends slightly thereabove. The front of the housing 21, above the tank 28, is open and normally closed by a hinged door 34.

Within the housing 21, at the top thereof, is a cover-equipped storage tank 35 for holding a supply of ground coffee, and which tank has an open hopper bottom and an open bottom coffee-measuring compartment 36 into which said hopper bottom empties. Imperforate bottom plates 37 and 38 are provided for alternately closing the hopper bottom of the tank 35 and the measuring compartment 36, respectively, the former of which plates is normally open and the latter of which is normally closed and supports the supply of coffee in the tank 35 and its measuring compartment 36.

Below the tank 35 are four pans 39, all of which have open hopper bottoms and open bottom ground coffee compartments 40 into which said pans empty. Imperforate bottom plates 41 and bottom sieves 42 are provided for alternately closing the hopper bottoms of the pan 39 and the compartments 40, respectively, and which plates 41 are normally open and which sieves 42 are normally closed. The bottom plates 37 and 38 are slidably mounted in horizontal grooves, in the sides of the compartment 36 and rear extensions 43 thereon, and the bottom plates 41 are slidably mounted in horizontal grooves in the sides of the compartments 40 and rear extensions 44 formed therewith. All of the sieves 42, with the exception of the lowermost, are slidably mounted in horizontal grooves in the respective compartments 40 and rear extension 44.

The lowermost pan 39 is directly above the liquid coffee tank 28 and its compartment 40 is loose and has transverse bars 45, the ends of which are mounted in grooves in said pan and its rear extension 44 and support said compartment for horizontal rearward sliding movement. The sieve 42 in the movable lower compartment 40 is hinged thereto at 46 and has at its sides a pair of rails 47 having oblique lower edges that are tapered toward said hinge and rest on the upper edge of the partition 33 and normally hold the respective sieve closed. When the movable compartment 40 is moved rearward, its rails 47 move from the partition 33 and allow the respective sieve 42 to swing downward and dump its contents into the tank 29.

On the sides of the tank 35 and each pan 39 are front and rear pairs of supporting lugs 48 slidably mounted on the horizontal rails 49 in the housing 21. Normally, the supporting lugs 48 rest in lock notches 50 in the rails 49 and hold the tank 35 and pans 39 properly positioned, the one under the other, and over the tank 28. The front edges of the lock notches 50 are inclined so that the supporting lugs 48 will gradually move into and out of the same during the sliding movement of the tank 35 and pans 39 on the rails 49, and which tank and pans may be independently removed from the housing 21 through the open front thereof for the purpose of cleaning or repairing the same and then replaced. A strainer 51 in the form of a cheesecloth is held over the entire open top of the tank 28 by a removable frame 52.

A water-measuring compartment 53 is mounted in the housing 21 back of the coffee storage tank 35 and has in its rear wall a water intake port 54 which opens into the water compartment 22, and also has in its bottom a water discharge port 55. A fan-like spout 56 on the bottom of the tank 53 is arranged to direct the water from the port 55 into the uppermost pan 39 and pour the same over the ground coffee in the compartment 40 thereof. Valves 57 and 58 are provided for the ports 54 and 55, respectively, and the former of which valves is normally closed and the latter of which is normally open. The valve 58 is arranged to be closed by a lifting movement and has an upright stem 59 attached to the intermediate portion of a horizontal lever 60, one end of which is fulcrumed to the partition 20. The valve 57 is arranged to close with the water pressure in the tank 22 and has a stem 61 attached to the valve stem 59 by a bell crank 62 for simultaneously operating said valves.

The following connections are provided for simultaneously moving the bottom plate 37 and the four bottom plates 41 into operative positions and thereafter simultaneously moving the bottom plate 38, the three uppermost sieves 47 and the lowermost or movable compartment 40 into inoperative positions, towit:

At the right-hand side of the apparatus is a hand crank 63 having a short shaft journaled in the hub of a lock segment 64 rigidly secured to the housing 21 at the outside thereof, projects therein and has rigidly secured to its inner end a cam head 65 having a cam slot 66. A latch 67, carried by the hand crank 63, co-operates with the lock segment 64 to hold said lever in a predetermined normal position. A pair of upright vertically movable parallel bars 68 and 69 have at their lower ends cam pins 70 and 71, respectively, and which cam pins project into the cam slot 66. The bar 68 is pivotally attached to and carried by the short arms of a pair of upper and lower bell cranks 72, and the upright bar 69 is pivoted to and carried by the short arms of a pair of upper and lower bell cranks 73. These bell cranks 72 and 73 are pivoted to the outer wall of the housing 21. Extended parallel to the bars 68 and 69 is a pair of bars 74 and 75 having at their ends hubs slidably mounted on upper and lower fixed shafts 76 carried by bearings 77 on the outer wall of the housing 21. These bars 74 and 75 are connected to long arms of the bell cranks 72 and 73 by slot and pin connections 78 for horizontal sliding movement toward and from each other.

The bar 74 has five vertically spaced rigid arms 79 having at their outer ends upturned studs 80 which project through apertured lugs 81 on the bottom plate 37 and the bottom plates 41, and which lugs work in horizontal slots in the rear extensions 43 and 44. The bar 75 also carries five rigid arms 82 having at their outer ends upturned studs 83 that project through apertured lugs 84 on the bottom plate 38, sieves 42 and movable compartment 40.

On the upper end of the bar 68 is a spring-projected latch 85 that normally extends under the free end of the lever 60. This latch 85 may be manually operated, at will, to release the lever 60, by means of a rod 86, having a hand piece outward of the housing 21. A the time the bar 74 is moved to project the bottom plate 37 under the hopper bottom of the tank 36 and the bottom plate 41 under the open hopper bottoms of the pans 39, said latch is carried upward by the bar 68 and thereby lifts the lever 60 and closes the valve 58, and opens the valve 57 to permit the compartment 53 to fill with water from the tank 22. At the limit of the lifting movement of the lever 60, a pivoted latch 88 moves thereunder, under the weight of a float 89 carried by an arm on said latch, and holds said lever after the other parts have been returned to normal positions. This latch 88 is pivoted to the top of the housing 21.

When the water in the measuring compartment 53 reaches a predetermined height, the float 89 is lifted thereby, releases the latch 88 and thereby permits the lever 60 to return the valves 57 and 58 to normal positions.

The operation of the apparatus may be briefly described as follows:

It may be assumed that there is a supply of ground coffee in the tank 35, in which case the measuring compartment 36 will be full, and that the water 2 in the compartment 22 is heated to the proper temperature and that the water-measuring compartment 53 is empty. In the normal position of the apparatus, the bottom plates 38 and 41 are retracted and the bottom plate 38 is positioned under the measuring compartment 35 and the sieves 42 are positioned under the compartments 40.

To start the apparatus, the operator releases the hand crank 61 and draws the same forward at the same time he draws outward on the hand piece 87 to release the latch 85 to cut out the action of the water supply. The initial movement of the hand crank 63 will move the cam head 65 and thereby cause the cam pin 70 in the slot 66 thereof to lift the bar 68 and thereby rock the bell cranks 72 which, in turn, slides the bar 74 toward the bar 75, which at this time is idle. This movement of the bar 74, acting through its arms 79 and their connections with the bottom plate 37 and the four bottom plates 41, will move said plates, the former into the compartment 36 and the latter to close the hopper bottoms of the pans 39. During the remaining forward movement of the hand crank 63 the cam head 65, acting on the cam pin 76 in the slot 66, will lift the bar 69 and thereby rock the bell cranks 73 which, in turn, slides the bar 75 toward the bar 74, which at this time is idle. This movement of the bar 75, acting through its arms 82 and their connections with the bottom plate 38, the three uppermost sieves 42 and the movable compartment 40, will retract said bottom plate, sieves and movable compartment. The retracting movement of the bottom plate 38 will release the measured ground coffee in the compartment 36 which is precipitated onto the bottom plate 41 in the uppermost pan 39.

The operator then returns the hand crank 63, and during its initial return movement, the bottom plate 38 will be projected into the compartment 36, the three uppermost sieves 42 into the respective compartments 40, and the movable compartment 40 returned to normal position, during which movement its sieve 42 will be closed by causing the rails 47 to draw over the partition 33. The remaining return movement of the hand crank 63 will retract the bottom plate 37 and thereby permit the measuring compartment 36 to again fill with ground coffee. It will also retract the four bottom plates 41, and this movement of the uppermost bottom plate 41 will scrape the ground coffee deposited thereon from the measuring compartment 36 and deposit the same on the underlying sieve 42.

The operator again repeats the above operation by means of the hand crank 63, and which operation deposits a further supply of ground coffee from the measuring compartment 36 on the uppermost bottom plate 41 and the former supply of ground coffee on the uppermost sieve 42 has been scraped therefrom and first deposited on the next underlying bottom plate 41 and thereafter scraped therefrom and deposited on the underlying sieve 42. It will thus be seen that there is now ground coffee on the two uppermost sieves 42 from which sufficient strength may be obtained to make coffee. The operator then releases the hand piece 87 and again repeats the first described operation by operating the hand crank 63. During this operation, the upward movement of the bar 68 will cause the released latch 85 to engage the lever 60 and thereby lift the same to close the bottom valve 58 and open the valve 57 to allow water to flow from the compartment 22 and fill the measuring compartment 53. At the limit of the lifting movement of the lever 60, the latch 88 will move thereunder and hold the same. This third operation of the hand crank 63 will cause the ground coffee on the two uppermost sieves 42 to be precipitated onto the underlying sieves and it will also release the measured quantity of coffee from the compartment 36 and deposit the same first on the top bottom plate 41 and then on the underlying sieve 42. At the completion of this operation by the return of the hand crank 63 to normal position, the water will have risen to a sufficient height in the measuring compartment 53 to lift the float 89 and thereby operate the latch 88 to release the lever 60 and thereby close the valve 57 and open the valve 58 to permit the measured water to flow from the compartment 53 into the spout 56 and be poured thereby onto the ground coffee on the uppermost sieve 42 which is washed thereby. The liquid coffee thus produced will then be precipitated on the ground coffee on the underlying sieve 42 and finally be collected in the tank 28.

A fourth operation of the hand crank 63 as above described will set the apparatus in full working order in which there is ground coffee on all the four sieves 42. During the fifth operation of the hand crank 63, the coffee grounds on the lowermost sieve 42 will be dumped into the waste receptacle 29 during the rearward movement of the respective compartment 40 which allows the said sieve to dump as previously described.

From the above description it is evident that during each operation of the hand crank 63 a given quantity of water is released from the measuring compartment 35 after a given quantity of coffee has been released from the measuring compartment 36. It is also evident that each measure of coffee will be washed with the water four times to remove all of the strength therefrom before the coffee grounds have been deposited in the waste receptacle 49.

The term "sieve" is herein used in a broad sense to cover any means for percolating coffee.

What I claim is:

1. In an apparatus for making coffee, the combination with a plurality of vertical spaced sieves, of means for intermittently depositing ground coffee on the uppermost sieve, means for progressively moving the same from one sieve to the other, and means for successively pouring boiling water on the ground coffee on the uppermost seive to produce liquid coffee and which liquid coffee is progressively poured on the ground coffee on the underlying sieves.

2. In an apparatus for making coffee, the combination with a plurality of vertical spaced sieves, of automatic means for intermittently depositing ground coffee on the uppermost sieve, means for progressively moving the same from one sieve to the other, and automatic means for successively pouring boiling water on the ground coffee on the uppermost sieve to produce liquid coffee and which liquid coffee is progressively poured on the ground coffee on the underlying sieves.

3. In an apparatus for making coffee, the combination with a supply tank for holding ground coffee and means for holding a supply of boiling water and automatically measuring the same, of automatic means for removing a given quantity of ground coffee from the supply tank, a plurality of vertically spaced sieves, means for intermittently depositing said given quantity of ground coffee on the uppermost sieve, means for progressively moving the same from one sieve to the other, and means for successively pouring the measured water on the ground coffee on the uppermost sieve to produce liquid coffee and which liquid coffee is progressively poured on the ground coffee on the underlying sieves.

4. The structure defined in claim 3 in further combination with means for collecting the liquid coffee.

5. The structure defined in claim 3 in further combination with means for collecting the liquid coffee, and means for collecting the coffee grounds from the lowermost sieve.

6. The structure defined in claim 3 in which said two means are timed for action in the order indicated.

7. The structure defined in claim 3 in which said two means are timed for action in the order indicated and are crank-actuated.

8. In an apparatus for making coffee, the combination with a supply tank for ground coffee having in its bottom a measuring compartment with a normally open top plate and a normally closed bottom plate, of a water supply tank and means for heating the same, a water-measuring compartment, automatic means for filling said water-measuring compartment from said water supply tank, a plurality of vertically spaced pans below said ground coffee-measuring compartment, each of said pans having a normally open bottom plate and a normally closed sieve, means for simultaneously moving said top and bottom plates and for simultaneously moving the bottom plate of the coffee-measuring compartment and the sieves in reverse order and timed relation, and means for releasing the measured water in timed relation to the movement of the sieves and delivering the same onto the uppermost sieves when closed.

9. The structure defined in claim 8 in further combination with means for collecting the liquid coffee from the lowermost sieve.

10. The structure defined in claim 8 in further combination with means for collecting the liquid coffee from the lowermost sieve, and means for collecting the coffee grounds from the lowermost sieve.

11. In an apparatus for making coffee, the combination with a plurality of vertical spaced sieves, of means for depositing ground coffee on the uppermost sieve, means for progressively moving the same from one sieve to the other, and means for successively pouring boiling water on the ground coffee on the uppermost sieve to produce liquid coffee and which liquid coffee is progressively poured on the ground coffee on the underlying sieves.

12. In an apparatus for making coffee, the combination with a plurality of vertically spaced sieves, each of which is adapted to hold a quantity of ground coffee, means for intermittently moving the ground coffee on the several sieves steps of movement downward and adding a fresh supply of ground coffee to the uppermost sieve, and means for intermittently pouring water on the ground coffee on the uppermost sieve to produce liquid coffee, which liquid coffee is progressively precipitated onto the ground coffee from one of the underlying sieves to the other.

13. The structure defined in claim 12 in further combination with means for intermittently dumping the coffee grounds on the lowermost sieve.

In testimony whereof I affix my signature.

JOHN SVENDSGAARD.